United States Patent [19]

Rajakovics et al.

[11] 4,043,875
[45] Aug. 23, 1977

[54] TWO-STEP FLASH TECHNIQUE FOR VAPORIZING RADIOACTIVE LIQUIDS

[75] Inventors: Gundolf E. Rajakovics, Vienna; Heinz Gabernig, Graz; Guenter Peter Klein, Vienna, all of Austria

[73] Assignee: Vereinigte Delstahlwerke AG. (VEW), Vienna, Austria

[21] Appl. No.: 641,770

[22] Filed: Dec. 17, 1975

Related U.S. Application Data

[63] Continuation-in-part of Ser. No. 328,065, Jan. 30, 1973.

[30] Foreign Application Priority Data

Feb. 2, 1972  Austria .................................. 842/72

[51] Int. Cl.² .............................................. B01D 3/00
[52] U.S. Cl. ........................................ 203/82; 202/173; 202/185 A; 203/75; 203/88; 252/301.1 W
[58] Field of Search ..................... 203/42, 75, 74, 77, 203/82, 88, 90, 100, 100 DC; 202/185 A, 173; 159/2, 3, DIG. 17; 252/301.1 W

[56] References Cited

U.S. PATENT DOCUMENTS

| | | | |
|---|---|---|---|
| 2,991,298 | 7/1961 | Raffaeta | 203/90 |
| 3,152,984 | 10/1964 | Winsche et al. | 159/DIG. 12 |
| 3,448,017 | 6/1969 | Chang et al. | 203/88 |
| 3,459,640 | 8/1969 | Tsunawki et al. | 203/88 |
| 3,475,329 | 10/1969 | Little et al. | 203/90 |
| 3,480,515 | 11/1969 | Goeldner | 203/90 |
| 3,707,442 | 12/1972 | Takahashi et al. | 202/173 |
| 3,734,835 | 5/1973 | Spicacci | 202/173 X |
| 3,763,016 | 10/1973 | Hair | 202/185 A |

Primary Examiner—Norman Yudkoff
Assistant Examiner—Dale Lovercheck

[57] ABSTRACT

An improved technique employing first and second flash vaporization stages for purifying radioactive liquids is described. The liquid is first flash-evaporated in the first vaporization stage and the resulting vapor is conducted to a first direct condenser. Enriched liquid obtained from the second vaporization stage is applied via a circulating pump to the first direct condenser to condense by contact the vapor from the first vaporization stage and to form a mixture with this condensate. The resulting mixture is thus flash-evaporated in the second vaporization stage. A portion of the enriched liquid obtained from the second vaporization stage is withdrawn from the loop formed by said second vaporization stage, said circulating pump, said first direct condenser, and the connecting conduits therebetween for further processing, e.g., recycling to the first vaporization stage, or for discharging.

19 Claims, 8 Drawing Figures

4,043,875

TWO-STEP FLASH TECHNIQUE FOR VAPORIZING RADIOACTIVE LIQUIDS

CROSS-REFERENCE TO RELATED APPLICATION

This is a continuation-in-part of copending, coassigned application Ser. No. 328,065, filed Jan. 30, 1973 and entitled "Process and Arrangement For Vaporizing of Liquids".

BACKGROUND OF THE INVENTION

In the treatment of radioactive liquid wastes, it is advantageous to employ vaporizing techniques, since the radioactive contaminants of the liquid are in general non-volatile and can to a large measure be disposed of in the liquid concentrate remaining after the liquid is vaporized. Advantageously, vapor resulting from the evaporation operation is then condensed for disposal, e.g. in an indirect condenser or by being contacted with liquid.

One general technique of this type is shown, e.g., in U.S. Pat. No. 3,480,515.

Unfortunately, conventional evaporation techniques of this type are limited in effectiveness by the fact that radioactive droplets of small diameter from the liquid to be purified are unavoidably carried along with the vapor from the evaporation stage, and serve to impose what has heretofore been an irreducible minimum concentration of radioactivity in the final product distillate.

SUMMARY OF THE INVENTION

Such disadvantages are overcome by the technique of the present invention, which employs at least one unit including first and second flash vaporization stages. The radioactive liquid to be purified is introduced to the first vaporization stage to be circulated, heated and flash-evaporated. The vapor resulting from the flash evaporation of the liquid in the first vaporization stage is applied to a first direct condenser, illustratively a mixing condenser. A portion or even all of the enriched liquid obtained from the second vaporization stage is applied via a circulating pump to the first direct condenser to condense the vapor from the first vaporization stage by contact with this condensate. At least a portion of this mixture is then flash-evaporated in the second vaporization stage. As a result, the second vaporization stage is effective to flash-evaporate components derived directly from the first vaporization stage and indirectly, via feedback, from the second vaporization stage itself. Said second vaporization stage, together with said circulating pump, said first direct condenser, and the connecting conduits therebetween, form a "loop". For limiting the enrichment of radioactivity in the second vaporization stage and, thereby, improving the effectiveness of the process, a portion of enriched liquid is withdrawn from said loop.

Preferably, the purified vapor emanating from the second vaporization stage is further condensed in a second indirect condenser. A portion of the resulting distillate is routed out of the unit for external utilization, and an additional portion of such distillate is fed back to said loop, illustratively on the suction side of the circulating pump.

Enriched liquid obtained from said loop may be:
cooled;
discharged from the unit, possibly by dilution with separate liquid;
combined with additional waste liquid, a portion of the resulting mixture, for example, may be discharged, another portion or even all of this mixture may be recycled to said first vaporization stage;
evaporated, e.g. in the first vaporization stage or in a third vaporization stage, the vapor formed in said third vaporization stage may be condensed by condensing means, such as the first direct condenser, the second indirect condenser, or a third condenser;
directed to another unit having first and second vaporization stages too;
processed by any possible combination of the above.

BRIEF DESCRIPTION OF THE DRAWING

Various arrangements of the invention are further set forth in the following detailed description taken in conjunction with the appended drawing, in which:

FIG. 3 shown cooling of said withdrawn enriched liquid. FIG. 4 shows combining said withdrawn enriched liquid with additional liquid, e.g. waste liquid, as well as discharging a portion of the so-formed mixture and/or recycling at least a portion of such mixture to the first vaporization stage. FIG. 5 shows evaporation of said withdrawn enriched liquid in a third vaporization stage as well as discharging the so-produced vapor or conducting it for being condensed in the second indirect condenser. FIG. 6 also shows evaporating said withdrawn enriched liquid in a third vaporization stage as well as condensing the so-produced vapor in a third condenser or conducting it for being condensed in the first direct condenser. FIG. 7 shows another embodiment of the process comprising first and second units, each of them having first and second vaporization stages wherein enriched liquid withdrawn from the loop of the first unit is conducted to the first vaporiztion stage of the second unit, and enriched liquid withdrawn from the loop of the second unit is conducted to the first vaporization stage of the first unit.

DETAILED DESCRIPTION

Figure 1:
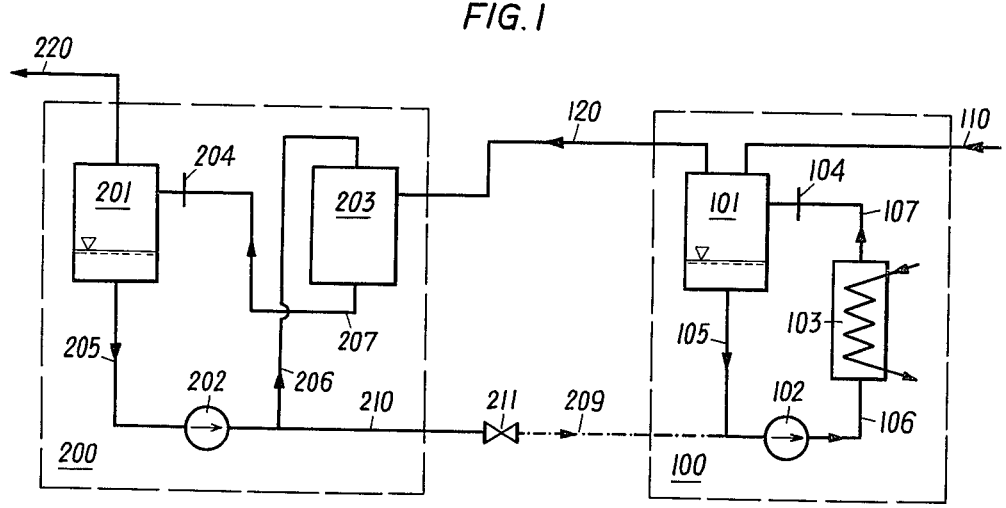
FIG. 1 is a schematic flow diagram of an improved two-stage flash-evaporation unit showing the main principles of the process according to the invention.

Referring now to the drawing, FIG. 1 is a schematic flow diagram of the main process, in accordance with the invention, for purifying radioactive liquid wherein radioactive liquid to be purified enters the first vaporization stage 100 by feed line 110, said first vaporization stage comprising a vapor separator 101, means 102, e.g., a pump, for circulating the liquid introduced, means 103, illustratively a steam-fed heat exchanger, for heating the circulating liquid, said first vaporization stage further comprising a flash device 104 and connecting conduits 105, 106, and 107.

In general, a vaporization stage in the sense of this application comprises at least a flash device, in which the pressure of the heated circulating liquid is reduced so that a portion of this liquid vaporizes, and a vapor separator in which the vapor produced in the flash device is separated from the remaining liquid. Flash device and vapor separator may be one assembly.

The liquid incoming by line 110 may illustratively be waste water issuing from a nuclear reactor (not shown) having a typical radioactive concentration in the range of $10^{-5} - 10^{-1}$ mCi/kg.

The liquid circulating in this arrangement may have a pressure of 5 atm established by the circulating means 102 in the section between the circulating means 102 and the flash device 104. In this case it is easy to prevent local boiling of the circulating liquid in order to reduce the danger of scaling in the heat exchanger 103. Nevertheless, the process also operates successfully without preventing local boiling of the circulating liquid before the flash device. The depicted heat exchanger 103 typically operates with a temperature differential of between 4° and 10° C.

The vapor generated by flash vaporization in the flash device 104 is separated from the remaining liquid in the vapor separator 101, which typically operates at 1.8 atm of vapor pressure and at a temperature of 117° C. The remaining liquid is recycled via conduit 105 to the pump 102 to be forced via conduit 106 to the heat exchanger 103 for being reheated and then via conduit 107 again to the flash device 104. The radioactive liquid entering the first vaporization stage 100 by feed line 110 may be mixed with the circulating liquid in the vapor separator 101, as shown in FIG. 1, as well as in any other possible part of the first vaporization stage 100. The liquid circulating in the first vaporization stage may typically have a radioactive concentration of 1 mCi/kg.

The vapor separated in separator 101, which at this point has a typical radioactive concentration of $5 \times 10^{-5}$ mCi/kg, is applied via conduit 120 to a first direct condenser 203, illustratively a mixing condenser, in which it will be condensed by liquid obtained from the vapor separator 201 of the second vaporization stage and forced to the first direct condenser 203 via conduits 205 and 206 by the circulating pump 202. The so-generated condensate is mixed in the first direct condenser 203 with the condensing liquid and the so-formed mixture directed via conduit 207 to the flash device 204.

Vapor separator 201 and flash device 204 together are called the second vaporization stage, which second vaporization stage, the circulating pump 202, the first direct condenser 203, and the connecting conduits 205, 206, and 207 are forming a "loop" 200.

In the flash device 204 the pressure of the liquid mixture, which is about 1.6 atm, is reduced so that a portion of the liquid mixture, which typically has a temperature of about 104° C to 110° C, evaporates. The vapor generated by flash device 204 is separated from the remaining liquid in the vapor separator 201, which typically operates at 1 atm of vapor pressure and at a temperature of 100° C. The remaining liquid is fed back via conduit 205 to the circulating pump 202.

The vapor separated in separator 201 is directed out via conduit 220 and may be further treated. It has a negligible radioactivity in the range of $2.5 \times 10^{-10}$ mCi/kg. Since the amount of radioactivity entering the loop with the vapor from the first vaporization stage 102 is much higher than that leaving the loop 200 with the vapor separated in separator 201, the radioactivity in the loop 200 would increase continuously and, therefore, reduce the effectiveness of the process.

For preventing this effect, the enrichment of the liquid circulating in the loop 200 is limited in accordance with the invention by withdrawing a portion of the enriched liquid from said loop 200 via conduit 210 and a control device 211, illustratively a valve. In FIG. 1 conduit 210 branches off conduit 206. This is an illustrative example only. The portion of enriched liquid also may be withdrawn from any other possible point of the loop 200. The portion of withdrawn enriched liquid has the typical amount of about 10 % by weight of the vapor exiting the vapor separator 201 by conduit 220. In this case the radioactive concentration of the enriched liquid withdrawn may be typically about $5 \times 10^{-4}$ mCi/kg.

Figure 2:
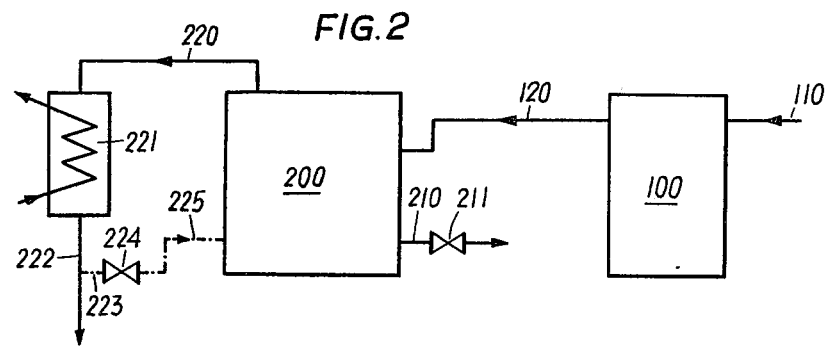
FIG. 2 is a simplified schematic flow diagram of the process as shown in FIG. 1 showing an additional step which deals with processing the vapor exiting the loop.

FIG. 2 is a schematic flow diagram with a simplified illustration of the main process further showing the step of condensing the vapor, coming from the loop 200 via conduit 220, in a second indirect condenser 221 the latter operating with a suitable external coolant. At least a portion of the distillate formed in said indirect condenser 221 will be discharged via conduit 222. Another portion may be recycled via conduits 223 and 225 and a control device 224, illustratively a valve, to the loop 200. In this way the balance of mass and heat in the liquid circulating in the loop may be achieved easily. The necessary amount of distillate to be recycled to the loop 200 is approximately the same as the amount of the portion of enriched liquid withdrawn from the loop 200.

FIGS. 3 to 7 are schematic flow diagrams of the process showing various possibilities in treating the enriched liquid withdrawn from the loop.

Figure 3:
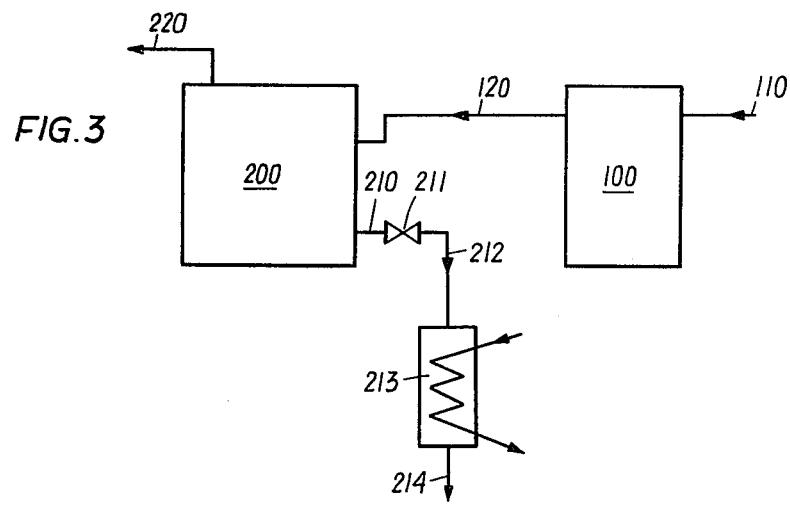
FIGS. 3 through 7 are schematic flow diagrams of the process showing various possibilities in treating the enriched liquid withdrawn from the loop.

In FIG. 3 the portion of enriched liquid withdrawn from the loop 200 is directed via conduits 210 and 212 and via a control device 211, illustratively a valve, to a heat exchanger 213, which operates with a suitable external coolant, for cooling the enriched liquid in this heat exchanger 213 and subsequently discharging it via conduit 214.

Figure 4:
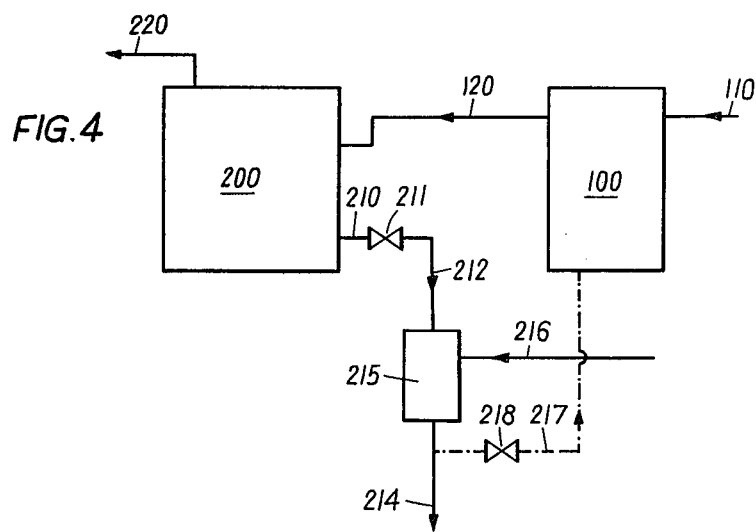

In FIG. 4 the withdrawn enriched liquid passes through conduits 210 and 212 via control device 211 to a mixing device 215, e.g., a tank, where it is mixed with additional liquid, e.g., liquid radwaste, which is conducted to the mixing device 215 by conduit 216. A portion or even all of the so-formed mixture may be discharged out of the installation via conduit 214. FIG. 4 also shows the possibility of recycling at least a portion of said mixture formed in device 215 via conduit 217 (dotted line) and a control device 218 to the first vaporization stage 100.

Evidently, it is not necessary to mix the enriched liquid, withdrawn from the loop 200 with additional liquid, prior to recycling it to the first vaporization stage 100; instead of this procedure, the enriched liquid may be directly recycled via conduit 210 and control device 211 using a further conduit 209, which is illustrated in FIG. 1 by a dotted line, extending from the control device 211 to the first vaporization stage 100.

Figure 5:
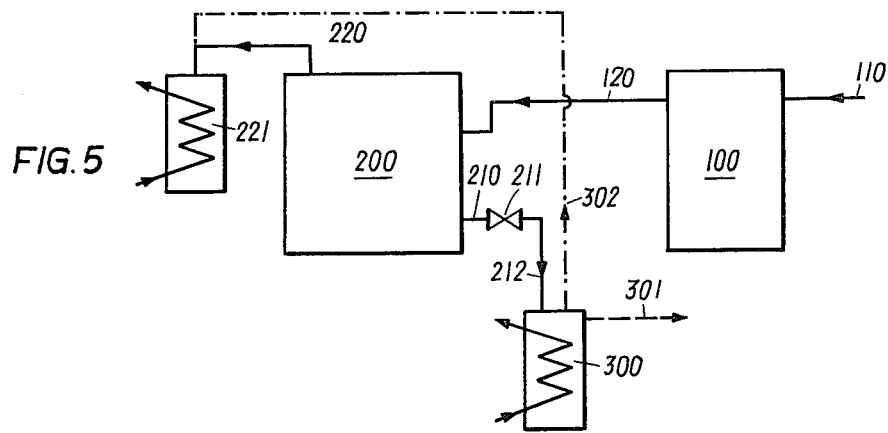
Figure 6:
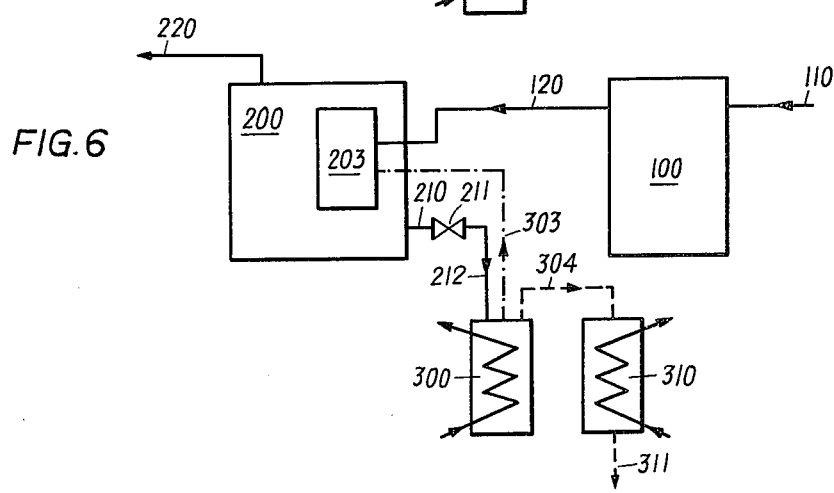

FIGS. 5 and 6 show evaporation of said withdrawn enriched liquid in a third vaporization stage. In both Figures the withdrawn enriched liquid is directed via conduit 210, control device 211 and conduit 212 to the third vaporization stage 300, which operates with a suitable external heat source, e.g., with heating steam.

In FIG. 5 the vapor produced in said third vaporization stage 300 may be discharged out of the installation via conduit 301 (dashed line). Another possibility shown in FIG. 5 is to conduct the vapor produced in stage 300 via a conduit 302 so that, finally, the vapor will be condensed, together with the vapor coming from the loop 200, in the second indirect condenser 221.

For this purpose, conduit 302 may terminate in conduit 220, as shown in FIG. 5, as well as directly in the condenser 221 or even in the separator 201 (not shown in FIG. 5).

In accordance with FIG. 6 further possibilities for treatment of the vapor produced in the third vaporization stage 300 are either to conduct the vapor via a conduit 304 to a third condenser 310 which operates with a suitable external coolant and to discharge the so-generated condensate via conduit 311 out of the unit or to conduct the vapor via conduit 303 so that the vapor finally will be condensed in the first direct condenser 203. The latter possibility may be achieved by terminating conduit 303 directly in the condenser 203, as shown in FIG. 6, as well as by connecting conduit 303 with conduit 120 or even with the separator 101 (not shown in FIG. 6).

Figure 7:
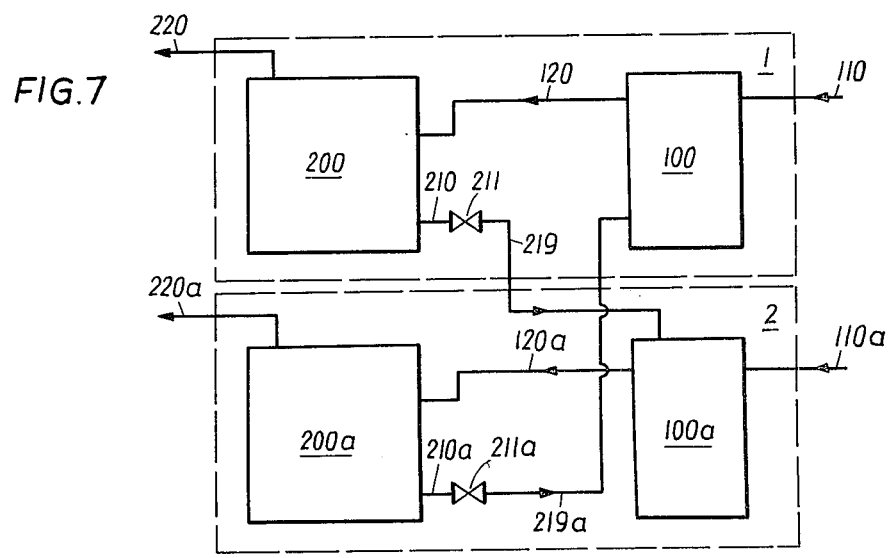

FIG. 7 depicts another embodiment of the process comprising first and second units each of them having first and second vaporization stages. Items of the first unit 1 are designated in FIG. 7 analoguously to FIG. 1, those of the second unit 2 are designated by numerals marked a. Enriched liquid withdrawn from the loop 200 of unit 1 is conducted via conduit 210, control device 211 and conduit 219 to the first vaporization stage 100$^a$ of unit 2; enriched liquid withdrawn from the loop 200$^a$ of unit 2 is conducted via conduit 210$^a$, control device 211$^a$ and conduit 219$^a$ to the first vaporization stage 100 of unit 1.

It will be understood, that even more than two units may be connected in a similar way so that the enriched liquid withdrawn from the loop of one unit always will be conducted to the first vaporization stage of another unit.

Figure 8:
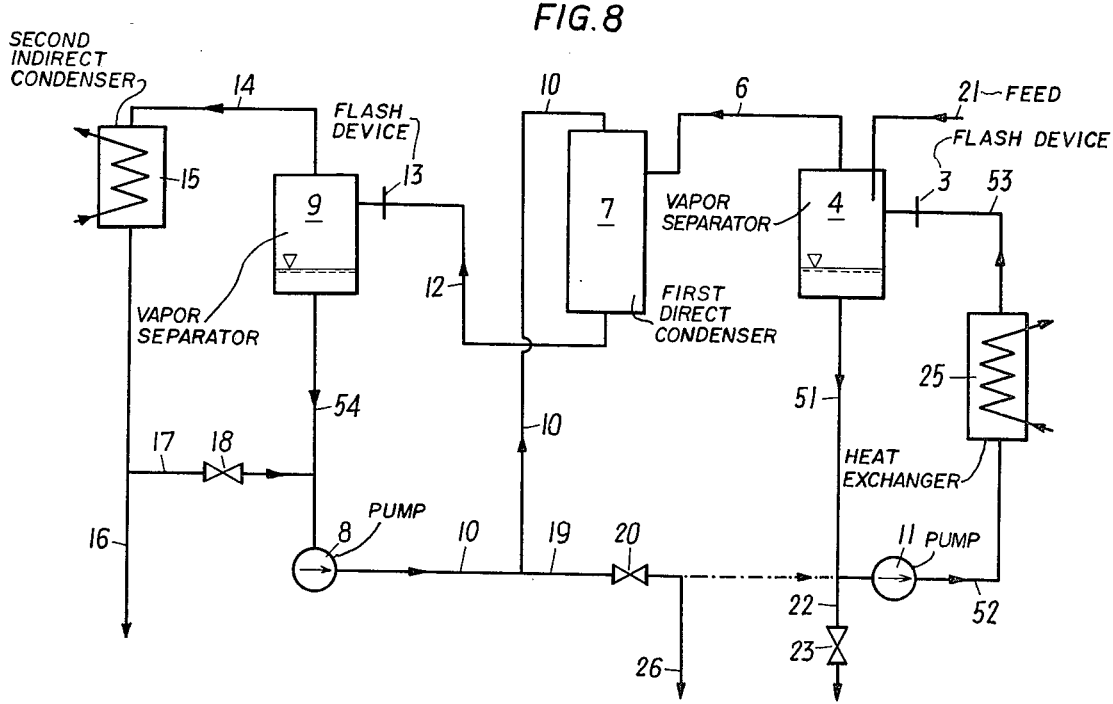
FIG. 8 is a schematic flow diagram of an installation constructed in accordance with the invention.

FIG. 8 shows a schematic flow diagram of an installation constructed in accordance with the invention. The installation has a first vaporization stage comprising a vapor separator 4, a pump 11, a heat exchanger 25, connecting conduits 51, 52, and 53 and discharging means 22 and 23. The radioactive liquid to be vaporized is fed into the first vaporization stage of the installation via first conduit means 21, and the liquid is forced from the vapor separator 4 by the pump 11 through conduits 51, 52, and 53 and the heat exchanger 25, in which it is heated, to the flash device 3 in which it is flash-evaporated. The heat exchanger preferably is heated by steam. The vapor produced in the flash device 3 is separated from the remaining liquid in the vapor separator 4 and conducted via fifth conduit means 6 to a first direct condenser 7 where it is condensed by contacting liquid obtained from a second vaporization stage, which consists of a vapor separator 9 and a flash device 13, said liquid being forced by a circulating pump 8 from the vapor separator 9 via second conduit means 54 and fourth conduit means 10 to the first direct condenser 7. The condensate formed in said first direct condenser 7 is mixed with the condensing liqid and the so-formed mixture directed via third conduit means 12 to the flash device 13 of the second vaporization stage for being flash-evaporated. The vapor separator 9, second conduit means 54, the circulating pump 8, fourth conduit means 10, the first direct condenser 7, third conduit means 12 and the flash device 13 form a "loop".

The vapor produced in the flash device 13 is separated from the remaining liquid in the separator 9 and conducted via sixth conduit means 14 to a second indirect condenser 15 where it is condensed. A portion of the produced distillate is discharged via discharging means 16, another portion may be recycled to the loop via eighth conduit means 17, this conduit means having a control device 18 for regulating the flow therethrough. The radioactive concentrate produced in the first vaporization stage can be discharged via discharging means 22 and 23, par example the latter being a valve.

A portion of enriched liquid is withdrawn from the loop via means for withdrawing liquid comprising conduit 19 and a control device 20, e.g., a control valve. The portion of enriched liquid then may be conducted either via a part 26 of the withdrawing means, for further treatment or discharge, or via a part 27 of said withdrawing means, which is illustrated in FIG. 8 with a dotted line, to the first vaporization stage, preferably to the suction side of pump 11.

In the foregoing, a plurality of illustrative arrangements of the invention have been described. Many variations and modifications will now occur to those skilled in the art. It is accordingly desired that the scope of the appended claims not be limited to the specific disclosure herein contained.

What is claimed is:

1. In a process for vaporizing a radioactive liquid by a two-step vaporization technique employing at least one unit having first and second flash-vaporization stages, wherein in each unit liquid is introduced to the first vaporization stage to be circulated, heated and flash-evaporated and wherein vapor resulting from the flash-evaporation of the liquid in the first vaporization stage is condensed in a first direct condenser, the improvement wherein the condensing step is accomplished by means of enriched liquid obtained from a second vaporization stage and applied via a circulating pump to the first condenser to form therein a mixture of the liquid obtained from the second vaporization stage and the condensate of the vapor from the first vaporization stage, and wherein the process further comprises the steps of flash-evaporating said mixture in the second vaporization stage and of withdrawing a portion of enriched liquid from the loop formed by said second vaporization stage, said circulating pump, said first direct condenser, and the connecting conduits therebetween.

2. A process as defined in claim 1, further comprising the step of condensing, in a second indirect condenser, the vapor formed in the second vaporization stage.

3. A process as defined in claim 2, further comprising the step of discharging a portion of the distillate produced in the second condenser.

4. A process as defined in claim 1, further comprising the step of discharging said withdrawn enriched liquid.

5. A process as defined in claim 1, further comprising the step of cooling said withdrawn enriched liquid.

6. A process as defined in claim 1, further comprising the step of combining said withdrawn enriched liquid with an additional waste liquid and discharging a portion of the resulting combined liquid.

7. A process as defined in claim 6, further comprising the step of recycling another portion of the combined liquid to the first vaporization stage.

8. A process as defined in claim 1, further comprising the step of evaporating said withdrawn enriched liquid.

9. A process as defined in claim 8, in which evaporating of said withdrawn enriched liquid takes place in a third vaporization stage.

10. A process as defined in claim 9, further comprising the step of condensing the vapor produced in said third vaporization stage by condensing means.

11. A process as defined in claim 10, in which the step of condensing the vapor produced in said third vaporization stage takes place in the first direct condenser.

12. A process as defined in claim 10, further comprising the step of condensing, in a second indirect condenser, the vapor formed in the second vaporization stage, and in which the step of condensing the vapor produced in said third vaporization stage takes place in said second indirect condenser.

13. A process as defined in claim 10, in which the step of condensing the vapor produced in said third vaporization stage takes place in a third condenser.

14. A process as defined in claim 8, in which the step of evaporating of said withdrawn enriched liquid takes place in the first vaporization stage comprising recycling said withdrawn enriched liquid to the first vaporization stage.

15. A process as defined in claim 3, further comprising the step of recycling another portion of the distillate produced in the second condenser to said loop.

16. A process as defined in claim 15, in which the recycling step comprises coupling the second indirect condenser to the suction side of the circulating pump.

17. A process as defined in claim 1, in which at least two units, each having first and second flash-vaporization stages, are used and wherein the withdrawn enriched liquid from one unit is conducted to and evaporated in the first vaporization stage of another unit.

18. In an installation for vaporizing a radioactive liquid:

a first vaporization stage comprising a flash device, circulating means, and means for heating liquid to be vaporized in the flash device;

first conduit means for feeding liquid to be vaporized to said first vaporization stage;

a first direct condenser;

a second vaporization stage comprising a flash device;

a circulating pump;

second conduit means for connecting the second vaporization stage to the suction side of said circulating pump;

third conduit means for connecting said first condenser to the flash device of the second vaporization stage;

fourth conduit means for connecting the pressure side of said circulating pump to said first condenser;

fifth conduit means for applying vapor formed in said first vaporization stage to said first condenser;

a second indirect condenser;

sixth conduit means for applying vapor formed in said second vaporization stage to said second condenser;

means for discharging a portion of the concentrate produced in said first vaporization stage;

means for withdrawing a portion of enriched liquid from the loop formed by the second vaporization stage, the circulating pump, the first direct condenser and the second, third and fourth conduit means; and means for discharging distillate produced in said second condenser.

19. An installation as defined in claim 18, further comprising eighth conduit means coupled to the distillate discharging means for applying a portion of the distillate produced in said second condenser to the suction side of said circulating pump, said eighth conduit means having a control device for regulating the flow therethrough.

* * * * *

UNITED STATES PATENT OFFICE
CERTIFICATE OF CORRECTION

Patent No. 4,043,875   Dated August 23, 1977

Inventor(s) Gundolf RAJAKOVICS, Heinz GABERNIG, Guenther KLEIN

It is certified that error appears in the above-identified patent and that said Letters Patent are hereby corrected as shown below:

On the cover sheet (Item) 73, Assignee should read:

--Vereinigte Edelstahlwerke Aktiengesellschaft (VEW)--

Signed and Sealed this

Twenty-eighth Day of March 1978

[SEAL]

Attest:

RUTH C. MASON
Attesting Officer

LUTRELLE F. PARKER
Acting Commissioner of Patents and Trademarks